(12) United States Patent
Kasperchik et al.

(10) Patent No.: US 11,753,703 B2
(45) Date of Patent: Sep. 12, 2023

(54) THREE-DIMENSIONAL PRINTING

(71) Applicant: Hewlett-Packard Development Company, L.P., Spring, TX (US)

(72) Inventors: Vladek Kasperchik, Corvallis, OR (US); Mohammed S. Shaarawi, Corvallis, OR (US); James McKinnell, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/047,467

(22) PCT Filed: Oct. 25, 2018

(86) PCT No.: PCT/US2018/057447
§ 371 (c)(1),
(2) Date: Oct. 14, 2020

(87) PCT Pub. No.: WO2020/086081
PCT Pub. Date: Apr. 30, 2020

(65) Prior Publication Data
US 2021/0237156 A1 Aug. 5, 2021

(51) Int. Cl.
*B33Y 10/00* (2015.01)
*C08K 3/11* (2018.01)
(Continued)

(52) U.S. Cl.
CPC ............... *C22C 1/05* (2013.01); *B22F 1/05* (2022.01); *B22F 1/052* (2022.01); *B22F 1/10* (2022.01);
(Continued)

(58) Field of Classification Search
CPC ...... B22F 10/14; B22F 2302/40; B33Y 70/00; B33Y 70/10
See application file for complete search history.

(56) References Cited

U.S. PATENT DOCUMENTS

| | | | |
|---|---|---|---|
| 2006/0000310 A1* | 1/2006 | Solimnjad | .......... C22C 33/0228 |
| | | | 75/252 |
| 2008/0122141 A1 | 5/2008 | Bedal et al. | |

(Continued)

FOREIGN PATENT DOCUMENTS

| | | | |
|---|---|---|---|
| EP | 1023383 B1 * | 12/2010 | ............ B22F 1/0059 |
| WO | 2018/017130 A1 | 1/2018 | |

(Continued)

OTHER PUBLICATIONS

Chevrier, Vincent L., et al. "Evaluating Si-based materials for Li-ion batteries in commercially relevant negative electrodes." Journal of the Electrochemical Society 161.5 (2014) (Year: 2014).*

(Continued)

*Primary Examiner* — Sally A Merkling
*Assistant Examiner* — Sean P. O'Keefe
(74) *Attorney, Agent, or Firm* — HP Inc. Patent Department

(57) ABSTRACT

A three-dimensional printing kit can include a binder fluid and a particulate build material. The particulate build material can include metal particles in an amount from about 95 wt % to about 99.995 wt % and carbon black particles in an amount from about 0.005 wt % to about 2 wt %, wherein weight percentages are based on a total weight of the particulate build material.

15 Claims, 3 Drawing Sheets

(51) Int. Cl.
| | |
|---|---|
| *B33Y 70/10* | (2020.01) |
| *B22F 10/14* | (2021.01) |
| *B22F 3/10* | (2006.01) |
| *B22F 1/05* | (2022.01) |
| *B22F 1/10* | (2022.01) |
| *B22F 1/145* | (2022.01) |
| *B22F 1/14* | (2022.01) |
| *B22F 1/052* | (2022.01) |
| *C22C 1/05* | (2023.01) |
| *B33Y 40/20* | (2020.01) |
| *C08K 3/04* | (2006.01) |

(52) U.S. Cl.
CPC .............. *B22F 1/14* (2022.01); *B22F 1/147* (2022.01); *B22F 3/1007* (2013.01); *B22F 3/1021* (2013.01); *B22F 10/14* (2021.01); *B33Y 10/00* (2014.12); *B33Y 40/20* (2020.01); *B33Y 70/10* (2020.01); *C08K 3/04* (2013.01); *C08K 3/11* (2018.01); *B22F 2301/35* (2013.01); *B22F 2302/40* (2013.01); *B22F 2304/054* (2013.01); *B22F 2304/056* (2013.01); *B22F 2304/10* (2013.01)

(56) References Cited

U.S. PATENT DOCUMENTS

| | | | |
|---|---|---|---|
| 2016/0002471 A1* | 1/2016 | Peng | ................. C09C 3/06 427/216 |
| 2016/0297142 A1 | 10/2016 | Bheda et al. | |
| 2016/0368244 A1 | 12/2016 | Chung | |
| 2017/0297103 A1 | 10/2017 | Myerberg et al. | |
| 2017/0297108 A1 | 10/2017 | Gibson et al. | |
| 2018/0022043 A1 | 1/2018 | Keoshkerian et al. | |
| 2018/0104894 A1 | 4/2018 | Fung et al. | |
| 2018/0147777 A1 | 5/2018 | Abbott, Jr. et al. | |
| 2018/0272600 A1 | 9/2018 | Shaarawi et al. | |
| 2019/0091766 A1 | 3/2019 | Kasperchik et al. | |
| 2019/0214631 A1* | 7/2019 | Fitch | .................. H01M 4/1395 |

FOREIGN PATENT DOCUMENTS

| | | |
|---|---|---|
| WO | 2018/083500 A1 | 5/2018 |
| WO | 2018/156938 A1 | 8/2018 |

OTHER PUBLICATIONS

Zhong, Haoxiang, et al. "The polyacrylic latex: an efficient water-soluble binder for LiNi1/3Co1/3Mn1/3O2 cathode in li-ion batteries." Journal of Solid State Electrochemistry 20.1 (2016): 1-8. (Year: 2016).*

Al-Hariri, Lara A., et al., "Carbon Nanotubes and Graphene as Additives in 3D Printing" (2016). Carbon Nanotubes—Current Progress of their Polymer Composites. 1448.

Verbelen, L., "Towards scientifically based screening criteria for polymer laser sintering", Arenberg Doctoral School, Faculty of Engineering Science, Nov. 2016, 154 pages.

* cited by examiner

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike other machining processes, which often rely upon the removal of material to create the final part. Some 3D printing methods use chemical binders or adhesives to bind build materials together. Other 3D printing methods involve partial sintering, melting, etc. of the build material. For some materials, partial melting may be accomplished using heat-assisted extrusion, and for some other materials curing or fusing may be accomplished using, for example, ultra-violet light or infrared light.

DETAILED DESCRIPTION

Figure 1:
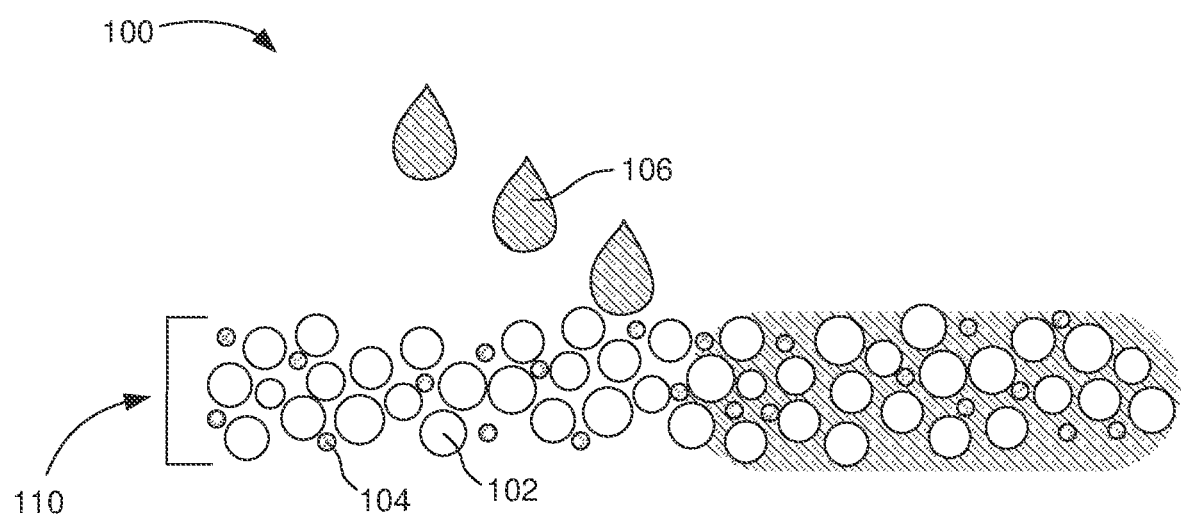
FIG. 1 graphically illustrates an example particulate build material and three-dimensional printing kit in accordance with the present disclosure.

Three-dimensional (3D) printing can be an additive process that can involve the application of successive layers of particulate build material with chemical binders or adhesives printed thereon to bind the successive layers of the particulate build materials together. In some processes, application of binder can be utilized to form a green body object and then a fused three-dimensional physical object can be formed therefrom. More specifically, binder fluid can be selectively applied to a layer of metal particulate build material on a build platform to pattern a selected region of the layer and then another layer of the particulate build material is applied thereon. The binder fluid can be applied to another layer of the particulate build material and these processes can be repeated to form a green part (also known as a 3D green body or object), which can then be heat fused to form a sintered 3D object.

In accordance with examples of the present disclosure, the use of small metal particles for three-dimensional printing can provide several benefits, including the production of rigid metal parts having high object resolution. Additionally, fusing, e.g., sintering, rates of 3D green body object can be positively affected by small particle sizes as well in some instances, e.g., as particle size decreases the sintering rate or time particles are kept at sintering temperatures may also decrease. Thus, though smaller particle sizes can provide these and potentially some other advantages, small metal particles often exhibit inter-particle cohesive forces that can result in particle agglomeration. As the inter-particle cohesive forces become stronger, flowability of the metal particulate build material can be negatively affected. For example, as the particle size decreases, inter-particle cohesive forces can increase. Thus, if using small metal particles for a particulate build material, agglomeration can often be an issue to be dealt with in order to benefit from the use of smaller sized particles, for example. "Sintering" typically occurs at temperatures and/or time frames below that which would otherwise be used to fully melt the particles.

It has been found that control additives in many instances can enable fine particulate build material powders to be utilized while reducing or preventing particle agglomeration, as they can decrease inter-particle cohesive forces (van der Waals, electrostatic attraction, etc.) between metal particles. However, typical flow control additives such as semi-metal and/or metal oxides, e.g., silica and/or aluminum oxides, may not be soluble or mixable with certain types of metal particulate build materials when heated to sintering temperatures, and thus, can create inclusions in sintered 3D object that can diminish the overall mechanical strength, can increase brittleness, and can reduce the structural properties of the sintered 3D object. In accordance with the present disclosure, and in examples herein, carbon black particles can alternatively be used as a flow control additive for metal particles of a particulate build material without the same diminishment of mechanical strength, increased brittleness, and/or reduced structural properties that some other types of flow control additives may introduce. This may be because the carbon black particles, in some instances, can be incorporated into a sintered 3D object during formation by forming metal carbides with the metal particles, and/or in other instances, can be removed or partially removed during sintering by reacting to form a gas that escapes from the boundaries of the 3D object during formation, for example.

In accordance with this, in one example, a three-dimensional printing kit can include a binder fluid and a particulate build material. The particulate build material can include metal particles in an amount from about 95 wt % to about 99.995 wt % and carbon black particles in an amount from about 0.005 wt % to about 2 wt %, based on a total weight of the particulate build material. In one example, the particulate build material can be devoid of oxide or semi-metal oxide flow control additives. In an example, the metal particles can include copper, cobalt, nickel, tungsten carbide, gold, silver, ferrous alloy, stainless steel, steel, high carbon steel, tool steel, an alloy thereof, or an admixture thereof. In another example, the metal particles can be stainless steel. In a further example, the metal particles can have a D50 particle size distribution value of from about 2 µm to about 40 µm. In another example, the carbon black particles have a D50 particle size distribution value of about 10 nm to about 200 nm. In yet another example, a surface area of the carbon black particles can range from about 50 m²/g to about 600 m²/g. In one example, the binder fluid can include water and latex particles in an amount of from about 5 wt % to about 30 wt %.

In another example, a particulate build material for three-dimensional printing can include metal particles in an amount from about 95 wt % to about 99.995 wt % and having a D50 particle size distribution value from about 2 µm to about 150 µm, and carbon black particles in an amount from about 0.005 wt % to about 2 wt % and having a D50 particle size distribution value from about 10 nm to about 200 nm, wherein weight percentages are based on a total weight of the particulate build material. In one example, the metal particles can include copper, cobalt, nickel, tungsten carbide, gold, silver, ferrous alloy, stainless steel, steel, high carbon steel, tool steel, an alloy thereof, or an admixture thereof and the particulate build material can be devoid of oxide or semi-metal oxide flow control additives.

In another example, a method of three-dimensional printing can include iteratively applying individual build material layers of a particulate build material including metal particles in an amount from about 95 wt % to about 99.995 wt % and carbon black particles in an amount from about 0.005 wt % to about 2 wt %, based on a total weight of the particulate build material; and based on a 3D object model, selectively applying a binder fluid to the individual build material layers to define individually patterned layers that are built up and bound together to form a 3D green body object. In one example, the method can further include heating a plurality of individually patterned layers to drive off water to further solidify the 3D green body object during formation. In another example, the method can further include sintering the 3D green body object at an elevated temperature from about 500° C. to about 3,500° C. to fuse the metal particles together and form a sintered 3D object. In yet another example, the sintering can occur in an atmosphere including a gas reactive with carbon at the elevated temperature to convert carbon from the carbon black particles to a gas, causing the carbon black particle content in the sintered 3D object to be lower than the particle content in the 3D green body object. In a further example, sintering can occur in an atmosphere inert with respect to carbon at the elevated temperature.

It is noted that when discussing the three-dimensional printing kit, the particulate build material, and/or the method of three-dimensional printing herein, these discussions can be considered applicable to one another whether or not they are explicitly discussed in the context of that example. Thus, for example, when discussing a metal particle related to a three-dimensional printing kit, such disclosure is also relevant to and directly supported in the context of the particulate build material, the method of three-dimensional printing, and vice versa.

It is also understood that terms used herein will take on their ordinary meaning in the relevant technical field unless specified otherwise. In some instances, there are terms defined more specifically throughout the specification or included at the end of the present specification, and thus, these terms can have a meaning as described herein.

Particulate Build Materials and Three-Dimensional Printing Kits

In accordance with examples of the present disclosure, a particulate build material 110 and a three-dimensional printing kit 100 is shown in FIG. 1. The particulate build material, by way of example, can include metal particles 102 in an amount from about 95 wt % to about 99.995 wt %, and carbon black particles 104 in an amount from about 0.005 wt % to about 2 wt %, based on a total weight of the particulate build material. The three-dimensional printing kit also shown in FIG. 1 can include the particulate build material in combination with a binder fluid 106, shown by example as droplets being applied to the particulate build material, but may alternatively be packaged as part of a kit with the particulate build material in containers. In some more specific examples, the metal particles can have a D50 particle size distribution value from about 2 μm to about 40 μm, and/or the carbon black particles can have a D50 particle size distribution value from about 10 nm to about 200 nm. In further detail, in some instances, the particulate build materials and/or the three-dimensional printing kit can be devoid of semi-metal or metal oxide flow control additives, such as fumed silica, aluminum oxide, etc., as in some instances, they may negatively affect the structural properties of a sintered 3D object. For example, fumed silica and aluminum oxides may not be removed or bond appropriately with sintering metal, and thus, may be present, but not bonded strongly, at grain boundaries in the sintered 3D object. As a result, the presence of the silica and/or aluminum oxides within the sintered 3D object can diminish a mechanical strength of the sintered 3D object.

Figure 2:
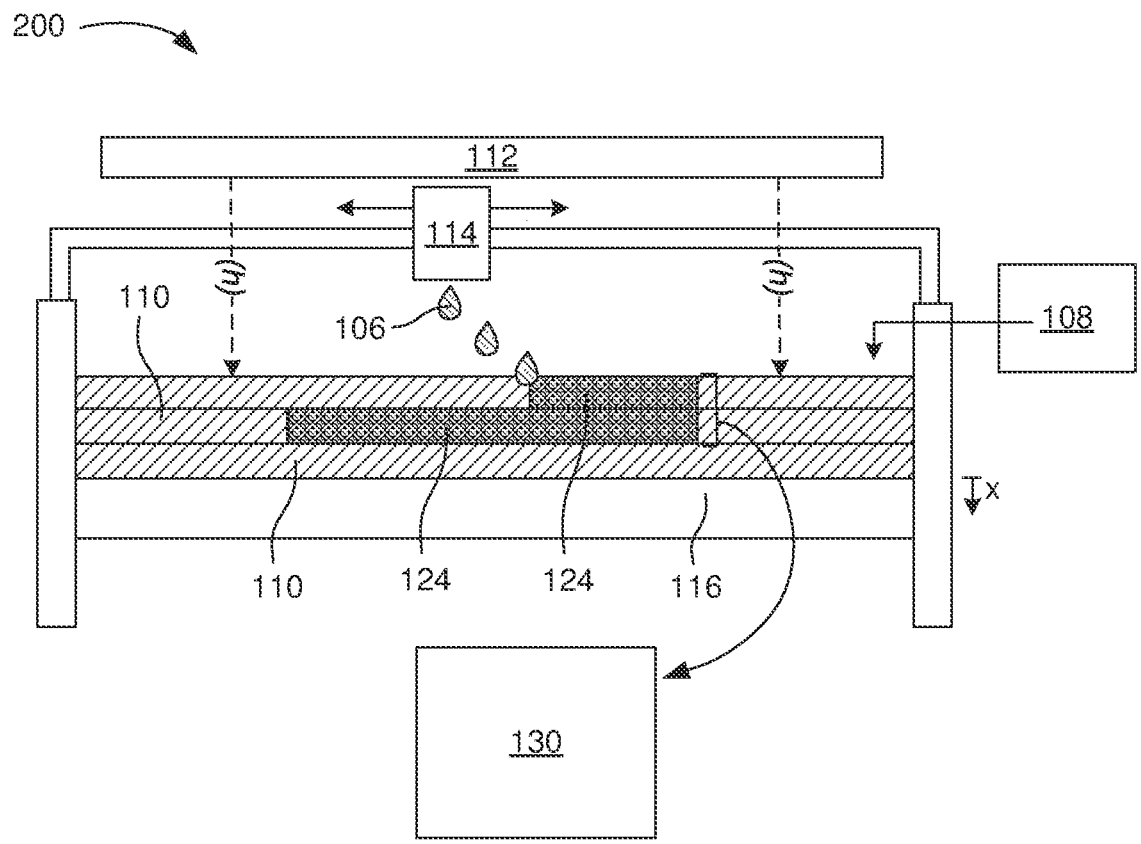
FIG. 2 graphically illustrates an example three-dimensional printing kit in example use in accordance with the present disclosure.

In FIG. 2, the three-dimensional printing kit shown at 100 in FIG. 1 is shown by example in use where the particulate build material 110 is deposited from a particulate build material source 108 onto a build platform 116 where it can be flattened or smoothed, such as by a mechanical roller or other flattening technique. In this example, the binder fluid 106 can include water and a binder, such as a latex particle binder or another polymeric binder, for example, which can be ejected onto the particulate build material from a fluid ejector 114, for example, to provide for selectively pattering the particulate build material. The location of the selective printing of the binder fluid can be to a layer corresponding to a layer of a 3D printed object, such as from a 3D object model or computer model. Heat (h) can be used, such as from a heat source 112, at the various layers (or group of layers, or after the 3D green body object is formed) to remove solvent from the binder fluid, which can assist with more rapid solidification of individual layers. In one example, heat can be applied from overhead, e.g., prior to application of the next layer of particulate build material, or after multiple layers are formed, etc.), and/or can be provided by the build platform from beneath the particulate build material and/or from the particulate build material source (preheating particulate build material prior to dispensing on the build platform or previously applied 3D object layer. After individual layers are printed with binder fluid, the build platform can be dropped a distance of (x), which can correspond to the thickness of a printed layer in one example, so that another layer of the particulate build material can be added thereon and printed with the binder fluid, etc. The process can be repeated on a layer by layer basis until a green body is formed that is stable enough to move to an oven 130 suitable for fusing, e.g., sintering, annealing, melting, or the like. The green body in this example includes a 3D object formed from solidified green body object layers 124, which include both particulate build material and binder fluid that delivers the latex particles thereto.

Metal Particles

The particulate build material can include metal particles of any type that can be fused together at fusing temperature (above the temperature at which the green body is formed). Fusing can be carried out by sintering, annealing, melting, or the like, metal particles together within the particulate build material. In one example, the particulate build material can include from about 95 wt % to about 99.995 wt % metal particles based on the total weight of the particulate build material.

In an example, the metal particles can be a single phase metallic material composed of one element. In this example, the fusing, e.g., sintering, annealing, etc., can occur at a temperature below the melting point of the element of the single phase metallic material. In other examples, the build material metal particles can be composed of two or more elements, which can be in the form of a single phase metallic alloy, e.g. the various particles are alloys, or a multiple phase metallic alloy, e.g. different particles can include different metals. In these examples, fusing generally can occur over a range of temperatures. With respect to alloys, materials with a metal alloyed to a non-metal (such as a metal-metalloid alloy) can be used as well.

In some examples, the metal particles can include particles of copper, cobalt, nickel, tungsten carbide, gold, silver, ferrous alloy, stainless steel, steel, high carbon steel, tool steel, an alloy thereof, or an admixture thereof. Specific alloy examples can include CoCr MP1, CoCr SP2, maraging steel MS1, hastelloy C, hastelloy X, nickel alloy HX, inconel IN625, inconel IN718, stainless steel GP1, stainless steel 17-4PH, stainless steel 316L, and stainless steel 430L. In one example, the metal particles can be stainless steel.

In one example, the D50 particle size of the metal particles can range from 2 μm to 40 μm. In some examples, the particles can have a D50 particle size distribution value that can range from about 15 μm to about 25 μm, from about 5 μm to about 20 μm, from about 10 μm to about 40 μm, from about 2 μm to about 30 μm, or from about 2 μm to about 35 μm. Individual particle sizes can be outside of these ranges, as the "D50 particle size" is defined as the particle size at which half of the particles are larger than the D50 particle size and about half of the other particles are smaller than the D50 particle size (by weight based on the metal particle content of the particulate build material).

As used herein, particle size can refer to a value of the diameter of spherical particles or in particles that are not spherical can refer to a longest dimension of that particle. The particle size can be presented as a Gaussian distribution or a Gaussian-like distribution (or normal or normal-like distribution). Gaussian-like distributions are distribution curves that can appear Gaussian in their distribution curve shape, but which can be slightly skewed in one direction or the other (toward the smaller end or toward the larger end of the particle size distribution range). That being stated, an example Gaussian-like distribution of the metal particles can be characterized generally using "D10," "D50," and "D90" particle size distribution values, where D10 refers to the particle size at the $10^{th}$ percentile, D50 refers to the particle size at the $50^{th}$ percentile, and D90 refers to the particle size at the $90^{th}$ percentile. For example, a D50 value of 25 μm means that 50% of the particles (by number) have a particle size greater than 25 μm and 50% of the particles have a particle size less than 25 μm. Particle size distribution values are not necessarily related to Gaussian distribution curves, but in one example of the present disclosure, the metal particles can have a Gaussian distribution, or more typically a Gaussian-like distribution with offset peaks at about D50. In practice, true Gaussian distributions are not typically present, as some skewing can be present, but still, the Gaussian-like distribution can be considered to be "Gaussian" as used in practice. The shape of the particles of the particulate build material can be spherical, non-spherical, random shapes, or a combination thereof.

Carbon Black Particles

In some examples, the particulate build material can further include carbon black particles at from about 0.005 wt % to about 2 wt % based on a total weight of the particulate build material. In some examples, the carbon black particles can be present at from about 0.005 wt % to about 1.5 wt %, from about 0.01 wt % to about 1 wt %, or from about 0.05 wt % to about 2 wt %.

The carbon black particles can, in one example, have a D50 particle size distribution value of about 10 nm to about 200 nm. In yet other examples, the carbon black particles can have a D50 particle size distribution value that can range from about 10 nm to about 50 nm, from about 15 nm to about 75 nm, from about 50 nm to about 150 nm, or from about 20 nm to about 120 nm.

The surface area of the carbon black particles can vary. In some examples, the surface area of the carbon black particles can range from about 50 $m^2/g$ to about 600 $m^2/g$. In other examples, the surface area of the carbon black particles can range from about 150 $m^2/g$ to about 550 $m^2/g$, from about 200 $m^2/g$ to about 400 $m^2/g$, from about 75 $m^2/g$ to about 250 $m^2/g$, or from about 115 $m^2/g$ to about 345 $m^2/g$. A surface area for carbon black particles can be determined using Brunauer-Emmett-Teller (BET) methodology for N2 gas adsorption on a surface of the carbon black particles.

The carbon black particles can be a commercially available carbon black. Example commercially available carbon black particles can include AEROSIL® R812, MONARCH® 1400, MONARCH® 1300, MONARCH® 1100, MONARCH® 1000, MONARCH® 900, MONARCH® 880, MONARCH® 800, and/or MONARCH® 700, all available from Cabot Corporation (USA); ORION® FW available from Palmer Holland (USA); PRINTEX® U, PRINTEX® V, PRINTEX® 140U, PRINTEX® 140V, PRINTEX® 75, PRINTEX® 85, PRINTEX® 95, Color Black FW 200, Color Black FW 2, Color Black FW 2V, Color Black FW 1, Color Black FW 18, Color Black S 160, Color Black S 170, Special Black 6, Special Black 5, Special Black 4A, and/or Special Black 4, all available from DEGUSSP® AG (Germany); RAVEN® 7000, RAVEN® 5750, RAVEN® 5250, RAVEN® 5000, and/or RAVEN® 3500 available from Columbian Chemicals (USA); and LHD9303 Black from Sun Chemical (USA). In one example, the carbon black particles can be PRINTEX® 75, PRINTEX® 85, PRINTEX® 95, or a combination thereof, all available from DEGUSSA® AG (Germany). In one example, the carbon black particles can act as a flow control additive for the particulate build material and can improve the flowability of the particulate build material.

Binder Fluids

The binder fluid can include an aqueous liquid vehicle and binder particles, e.g., latex particles, to bind the particulate build material together during the build process to form a 3D green body object. The binder fluid can be applied to the particulate build material on a layer by layer basis. Heat (below metal sintering temperatures) can be applied on a layer by layer basis, upon formation of a plurality of layers of the green body, or in some cases, after the green body is fully formed. The binder fluids described herein can further include liquid vehicle ingredients, such as organic co-solvents, biocides, viscosity modifiers, pH adjusters, sequestering agents, preservatives, etc. The binder fluid can act to bind the particulate build material together during three-dimensional printing. During three-dimensional printing, binder fluid can be applied to the particulate build material on a layer by layer basis and can move into vacant spaces between particles of the particulate build material.

In one example, the binder fluid can include water and latex particles in an amount of from about 5 wt % to about 30 wt %. In yet other examples, the latex particles can be present at from about 5 wt % to about 30 wt %, from about 10 wt % to about 25 wt %, or from about 5 wt % to about 20 wt %. The latex particles can be a polymer that can have different morphologies. In one example, the latex particles can include two different copolymer compositions, which may be fully separated core-shell polymers, partially occluded mixtures, or intimately comingled as a polymer solution. In another example, the latex particles can be individual spherical particles containing polymer compositions of hydrophilic (hard) component(s) and/or hydrophobic (soft) component(s) that can be interdispersed. In one example, the interdispersion can be according to IPN (interpenetrating networks). In yet another example, the latex particles can be composed of a hydrophobic core surrounded by a continuous or discontinuous hydrophilic shell. For example, the particle morphology can resemble a raspberry, in which a hydrophobic core can be surrounded by several smaller hydrophilic particles that can be attached to the core. In yet another example, the latex particles can include 2, 3, or 4 or more relatively large polymer particles that can be attached to one another or can surround a smaller polymer core. In a further example, the latex particles can have a single phase morphology that can be partially occluded, can be multiple-lobed, or can include any combination of any of the morphologies disclosed herein.

In some examples, the latex particles can be heteropolymers or copolymers. As used herein, a heteropolymer can include a hydrophobic component and a hydrophilic component. A heteropolymer can include a hydrophobic component that can include from about 65% to about 99.9% (by weight of the heteropolymer), and a hydrophilic component that can include from about 0.1% to about 35% (by weight of the heteropolymer). In one example, the hydrophobic component can have a lower glass transition temperature than the hydrophilic component.

In some examples, the latex particles can be composed of a polymerization or co-polymerization of acrylic monomers, styrene monomers, or a combination thereof. Example monomers can include, C1-C20 linear or branched alkyl (meth)acrylate, alicyclic (meth)acrylate, alkyl acrylate, styrene, methyl styrene, polyol (meth)acrylate, hydroxyethyl (meth)acrylate, (meth)acrylic acid, or a combination thereof. In one specific class of examples, the latex particles can be a styrene (meth)acrylate copolymer. The term "(meth)acrylate" or "(meth)acrylic acid" or the like refers to monomers, copolymerized monomers, etc., that can either be acrylate or methacrylate (or a combination of both), or acrylic acid or methacrylic acid (or a combination of both). In some examples, the terms "(meth)acrylate" and "(meth)acrylic acid" can be used interchangeably, as acrylates and methacrylates are salts and esters of acrylic acid and methacrylic acid, respectively. Furthermore, mention of one compound over another can be a function of pH. Furthermore, even if the monomer used to form the polymer was in the form of a (meth)acrylic acid during preparation, pH modifications during preparation or subsequently when added to an ejectable fluid, such as a binder fluid, can impact the nature of the moiety as well (acid form vs. salt or ester form). Thus, a monomer or a moiety of a polymer described as (meth) acrylic acid or as (meth)acrylate should not be read so rigidly as to not consider relative pH levels, ester chemistry, and other general organic chemistry concepts. In still another example, the latex particles can include a copolymer with copolymerized methyl methacrylate being present at about 50 wt % or greater, or copolymerized styrene being present at about 50 wt % or greater. Both can be present, with one or the other at about 50 wt % or greater in a more specific example.

In other examples, the latex particles in the binder fluid include polymerized monomers of vinyl, vinyl chloride, vinylidene chloride, vinyl ester, acrylate, methacrylate, styrene, ethylene, maleate esters, fumarate esters, itaconate esters, α-methyl styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, 2-ethylhexyl acrylate, 2-ethylhexyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, isobornyl methacrylate, cyclohexyl methacrylate, trimethyl cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, isobornyl acrylate, dimethyl maleate, dioctyl maleate, acetoacetoxyethyl methacrylate, diacetone acrylamide, N-vinyl imidazole, N-vinylcarbazole, N-Vinyl-caprolactam, combinations thereof, derivatives thereof, or mixtures thereof. These monomers include low glass transition temperature (Tg) monomers that can be used to form the hydrophobic component of a heteropolymer.

In other examples, a composition of the latex particles can include acidic monomers. In some examples, the acidic monomer content can range from 0.1 wt % to 15 wt %, from 0.5 wt % to 12 wt %, or from 1 wt % to 10 wt % of the latex particles with the remainder of the latex particles being composed of non-acidic monomers. Example acidic monomers can include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, or mixtures thereof. These acidic monomers are higher Tg hydrophilic monomers, than the low Tg monomers above, and can be used to form the hydrophilic component of a heteropolymer. Other examples of high Tg hydrophilic monomers can include acrylamide, methacrylamide, monohydroxylated monomers, monoethoxylated monomers, polyhydroxylated monomers, or polyethoxylated monomers.

In an example, the selected monomer(s) can be polymerized to form a polymer, heteropolymer, or copolymer with a co-polymerizable dispersing agent. The co-polymerizable dispersing agent can be a polyoxyethylene compound, such as a HITENOL® compound (Montello Inc.) e.g., polyoxyethylene alkylphenyl ether ammonium sulfate, sodium polyoxyethylene alkylether sulfuric ester, polyoxyethylene styrenated phenyl ether ammonium sulfate, or mixtures thereof. Any suitable polymerization process can be used. In some examples, an aqueous dispersion of latex particles can be produced by emulsion polymerization or co-polymerization of any of the above monomers.

In one example, the latex particles can be prepared by polymerizing high Tg hydrophilic monomers to form the high Tg hydrophilic component and attaching the high Tg hydrophilic component onto the surface of the low Tg hydrophobic component. In another example, the latex particles can be prepared by polymerizing the low Tg hydrophobic monomers and the high Tg hydrophilic monomers at a ratio of the low Tg hydrophobic monomers to the high Tg hydrophilic monomers that ranges from 5:95 to 30:70. In this example, the low Tg hydrophobic monomers can dissolve in the high Tg hydrophilic monomers. In yet another example, the latex particles can be prepared by polymerizing the low Tg hydrophobic monomers, then adding the high Tg hydrophilic monomers. In this example, the polymerization process can cause a higher concentration of the high Tg hydrophilic monomers to polymerize at or near the surface of the low Tg hydrophobic component. In still another example, the latex particles can be prepared by copolymerizing the low Tg hydrophobic monomers and the high Tg hydrophilic monomers, then adding additional high Tg hydrophilic monomers. In this example, the copolymerization process can cause a higher concentration of the high Tg hydrophilic monomers to copolymerize at or near the surface of the low Tg hydrophobic component.

Other suitable techniques, specifically for generating a core-shell structure, can include grafting a hydrophilic shell onto the surface of a hydrophobic core, copolymerizing hydrophobic and hydrophilic monomers using ratios that lead to a more hydrophilic shell, adding hydrophilic monomer (or excess hydrophilic monomer) toward the end of the copolymerization process so there is a higher concentration of hydrophilic monomer copolymerized at or near the surface, or any other method can be used to generate a more hydrophilic shell relative to the core.

In one specific example, the low Tg hydrophobic monomers can be selected from the group consisting of C4 to C8 alkyl acrylate monomers, C4 to C8 alkyl methacrylate monomers, styrene monomers, substituted methyl styrene monomers, vinyl monomers, vinyl ester monomers, and combinations thereof; and the high Tg hydrophilic monomers can be selected from acidic monomers, unsubstituted amide monomers, alcoholic acrylate monomers, alcoholic methacrylate monomers, C1 to C2 alkyl acrylate monomers, C1 to C2 alkyl methacrylate monomers, and combinations thereof. The resulting polymer latex particles can exhibit a core-shell structure, a mixed or intermingled polymeric structure, or some other morphology.

In some examples, the latex polymer can have a weight average molecular weight (Mw) that can range from about 5,000 Mw to about 2,000,000 Mw. In yet other examples, the weight average molecular weight can range from about 100,000 Mw to about 1,000,000 Mw, from about 100,000 Mw to about 500,000 Mw, from about 150,000 Mw to about 300,000 Mw, or from about 50,000 Mw to about 250,000 Mw. Weight average molecular weight (Mw) can be measured by Gel Permeation Chromatography with polystyrene standard.

In some examples, the latex polymer particles can be latent and can be activated by heat (applied iteratively or after green body formation). In these instances, the activation temperature can correspond to the minimum film formation temperature (MFFT) or a glass transition temperature (Tg) which can be greater than ambient temperature. As mentioned herein, "ambient temperature" may refer to room temperature (e.g., ranging about 18° C. to about 22° C.). In one example, the latex polymer particles can have a MFFT or Tg that can be at least about 15° C. greater than ambient temperature. In another example, the MFFT or the Tg of the bulk material (e.g., the more hydrophobic portion) of the latex polymer particles can range from about 25° C. to about 200° C. In another example, the latex particles can have a MFFT or Tg ranging from about 40° C. to about 120° C. In yet another example, the latex polymer particles can have a MFFT or Tg ranging from about 50° C. to about 150° C. In a further example, the latex polymer particles can have a Tg that can range from about −20° C. to about 130° C., or in another example from about 60° C. to about 105° C. At a temperature above the MFFT or the Tg of a latent latex polymer particle, the polymer particles can coalesce and can bind materials.

The latex particles can have a particle size that can be jetted via thermal ejection or printing, piezoelectric ejection or printing, drop-on-demand ejection or printing, continuous ejection or printing, etc. In an example, the particle size of the latex particles can range from about 10 nm to about 400 nm. In yet other examples, a particle size of the latex particles can range from about 10 nm to about 300 nm, from about 50 nm to about 250 nm, from about 100 nm to about 300 nm, or from about 25 nm to about 250 nm.

In the various binder fluids described herein, these fluids can be aqueous fluids, and can include liquid vehicle ingredients, such as water, organic co-solvents, biocides, viscosity modifiers, pH adjusters, sequestering agents, preservatives, latex polymer, etc. More detail regarding the liquid vehicles that can be used is provided hereinafter.

Three-Dimensional Printing Method

Figure 3:
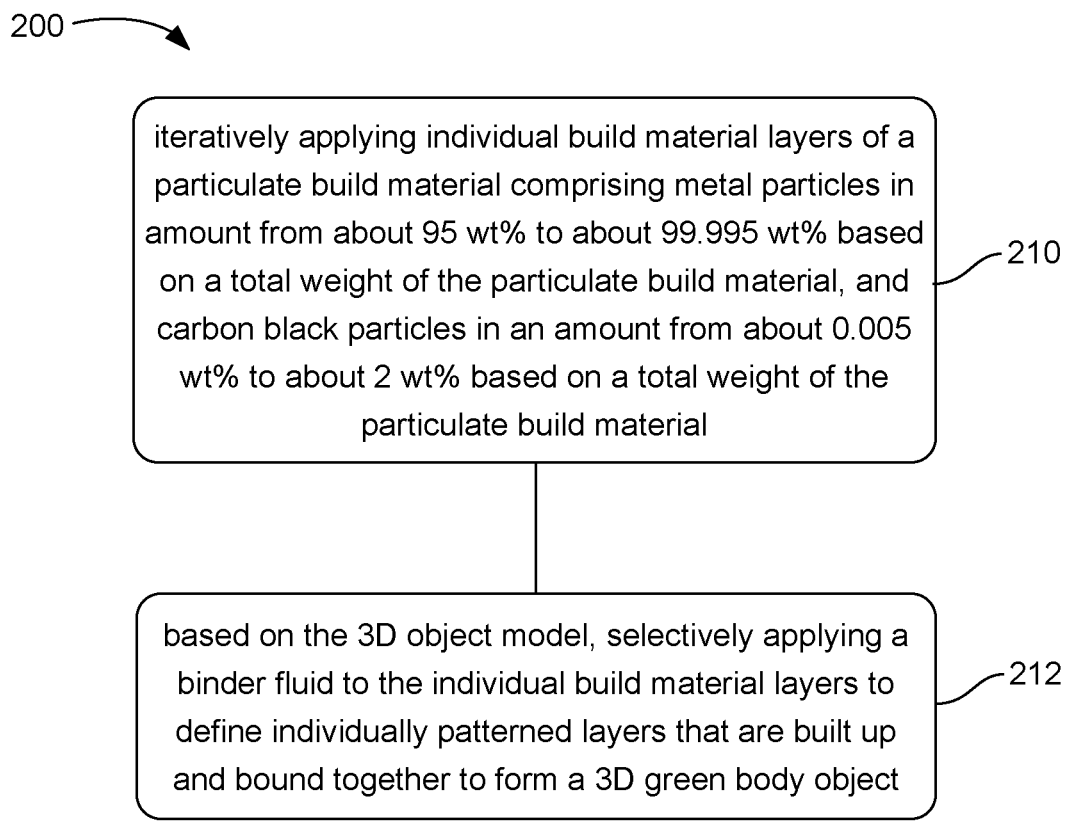
FIG. 3 is a flow diagram illustrating an example method of three-dimensional printing in an example use in accordance with the present disclosure.

A flow diagram of an example method of three-dimensional (3D) printing 200 is shown in FIG. 3. The method can include iteratively 210 applying individual build material layers of a particulate build material including from about 95 wt % to about 99.995 wt % metal particles and from about 0.005 wt % to about 2 wt % carbon black particles, based on a total weight of the particulate build material; and based on a 3D object model, and selectively applying 212 a binder fluid to the individual build material layers to define individually patterned object layers that are built up and bound together to form a 3D green body object. In some examples, the method can further include heating a plurality of individually patterned layers to drive off water to further solidify the 3D green body object during formation. The particulate build material, metal particles, carbon black particles, and binder fluid can be as described above.

In further detail, iterative applying individual build material layers of the particulate build material can include applying individual build material layers at a thickness that can range from about 50 µm to about 300 µm, for example. The binder fluid can be selectively printed from a print head that can be a piezoelectric print head, thermal inkjet print head, or a continuous inkjet print head. In one example, the binder can be applied at a temperature ranging from ambient (about 25° C.) to about 100° C. After an individual layer is printed with binder fluid and then in some instances heated to drive off water and to further solidify the 3D green body object, a build platform can be dropped a distance of (x), which can correspond to the thickness of a printed layer of the 3D green body object, so that another layer of the particulate build material can be added thereon, printed with binder fluid, solidified, etc. The process can be repeated on a layer by layer basis until the entire 3D green body object is formed that is stable enough to move to an oven suitable for fusing, e.g., sintering, annealing, melting, or the like.

In some examples, heat can be applied to the individual layers (or group of layers) with binder fluid printed thereon to drive off water from the binder fluid and to further solidify the individual layers of the 3D green body object. For example, the heat can be applied at a temperature that can range from about 18° C. to about 300° C. or from about 50° C. to about 200° C. In one example, heat can be applied from overhead and/or can be provided by the build platform from beneath the particulate build material. In some examples, the particulate build material can be heated prior to dispensing. Further, the heating can occur upon application of the binder fluid to the individual layer or following application of all the printed binder fluid. The temperature(s) at which the metal particles of the particulate build material are glued together by binder applied is/are above the temperature of the environment in which the patterning portion of the 3D printing method is performed, e.g., patterning at from about 18° C. to about 300° C. and sintering at from about 500° C. to about 3,500° C. In some examples, the metallic build material particles may have a melting point ranging from about 500° C. to about 3,500° C. In other examples, the metallic build material particles may be an alloy having a range of melting points.

Thus, following the formation of the 3D green body object, the entire 3D green body object can be extracted from the powder bed and moved to an oven and heated to a temperature ranging from about 500° C. to about 3,500° C., or more typically from about 500° C. to about 1,500° C. to fuse the metal particles together and to form a sintered 3D object. In some examples, the temperature can range from about 600° C. to about 1,200° C., from about 800° C. to about 1,200° C., or from about 750° C. to about 1,500° C. Sintering can occur at a temperature that can be below a melting temperature of the metal particles. Depending on the metal particles, these temperature ranges can be used to melt an outer layer of the metal particles and can permit sintering of the metal particles to one another, while not melting an inner portion of the metal particles, in one example.

The eventual sintering temperature range can vary, depending on the material, but in one example, the sintering temperature can range from about 10° C. below the melting temperature of the metal particles of the particulate build material to about 50° C. below the melting temperature of the metal particles of the particulate build material. The sintering temperature can also depend upon the particle size and period of time that heating occurs, e.g., at a high temperature for a sufficient time to cause particle surfaces to become physically merged or composited together. For example, a sintering temperature for stainless steel can be about 1400° C. and an example of a sintering temperature for aluminum or aluminum alloys can range from about 550° C. to about 620° C. The sintering temperature can sinter and/or otherwise fuse the metal particles to form the sintered 3D object.

In some examples, the carbon black particles can interact with the metal particles at elevated temperatures and can form metal carbides during sintering. In these examples, the carbon black particles can be incorporated into the printed 3D object. In other examples, the sintering can occur in an atmosphere including a gas reactive with carbon at the elevated temperature to convert the carbon black particles to a gas, causing the carbon black particle content in the sintered 3D object to be lower than the particle content in the 3D green body object.

In one example, the heating can occur in a gas reactive atmosphere that can include controlled amounts of oxygen. In some examples, the oxygen can be present in the gas reactive atmosphere at from about 1 e-8 atm. to about 1 e-6 atm. Controlled oxidation of the carbon black can form carbon dioxide ($CO_2$) and carbon monoxide (CO) by products.

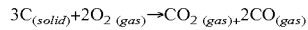

In some examples, the oxygen can be present in the reducing atmosphere at an amount of from about 25 e-6 atm to about 5 e-8 atm, or from about 5 e-7 atm to about 5 e-8 atm or from about 25 e-6 atm to about 25 e-7 atm.

In yet other examples, the heating can occur in a gas reactive atmosphere that can include hydrogen gas at from about 0.5 wt % to less than 100 wt %. The hydrogen gas can react with carbon black pigment, as shown below, to form methane gas.

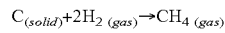

As the methane gas is generated, carbon black particles can be removed from the surface of the green body. In other examples, the hydrogen gas can be present in the reducing atmosphere at an amount of from about 2 wt % to about 100 wt %, from about 2 wt % to about 20 wt %, from about 25 wt % to about 50 wt %, or from about 30 wt % to about 90 wt %.

The 3D green object body formed from the three-dimensional printing method herein can allow metal particles having a D50 particle size distribution value from about 2 μm to about 40 μm to be used. The carbon black particles can decrease inter-particle cohesive forces between metal particles, which can thereby prevent or can reduce particle agglomeration of the metal particles, and can permit thin layers of the particulate build material to be spread in a powder bed support substrate. In addition, the ability to utilize metal particles having a D50 particle size distribution value from about 2 μm to about 40 μm can permit faster fusing of the 3D green body object and can permit structural stability to the sintered 3D object.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, the phrase "green part," "green body," and "layered green body" refers to any intermediate structure prior to any particle to particle material fusing, including a green 3D object or object layer(s), a green 3D support structure or support structure layer(s), or an intermediate 3D breakaway interface or breakaway interface layer(s). As a green body, the particulate build material can be (weakly) bound together by a binder fluid. Typically, a mechanical strength of the green body is such that the green body can be handled or extracted from a build platform to place in a fusing oven. It is to be understood that any particulate build material that is not patterned with the binder fluid is not considered to be part of the green body, even if the particulate build material is adjacent to or surrounds the green body. For example, unprinted particulate build material can act to support the green body while contained therein, but the particulate build material is not part of the green body unless the particulate build material is printed with binder fluid, or some other fluid that is used to generate a solidified part prior to fusing, e.g., sintering, annealing, melting, etc.

As used herein, the terms "3D part," "3D object," or the like, refers to the target 3D object that is being built. The 3D object can be referred to as a "fused" 3D object, indicating that the object has been fused such as by sintering, annealing, melting, etc., or a "green body" or "green" 3D object, indicating the object has been solidified, but not fused.

"Binder fluid" refers to a fluid that includes water and binder particles that are effective for binding layers of particulate build material when forming a green body. The binder fluid is typically applied to form a green body 3D object.

The term "fluid" does not infer that the composition is free of particulate solids, but rather, can include solids dispersed therein, including carbon black pigment, latex particles, or other solids that are dispersed in the liquid vehicle of the fluid.

As used herein, "kit" can be synonymous with and understood to include a plurality of compositions including one or more components where the different compositions can be separately contained in one or more containers prior to and during use, e.g., building a 3D object, but these components can be combined together during a build process. The containers can be any type of a vessel, box, or receptacle made of any material.

The term "fuse," "fusing," "fusion," or the like refers to the joining of the material of adjacent particles of a particulate build material, such as by sintering, annealing, melting, or the like, and can include a complete fusing of adjacent particles into a common structure, e.g., melting together, or can include surface fusing where particles are not fully melted to a point of liquefaction, but which allow for individual particles of the particulate build material to become bound to one another, e.g., forming material bridges between particles at or near a point of contact.

As used herein, a plurality of items, structural elements, compositional elements, and/or materials may be presented in a common list for convenience. However, these lists should be construed as though the individual member of the list is identified as a separate and unique member. Thus, no individual member of such list should be construed as a de facto equivalent of any other member of the same list based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as the individual numerical value and/or sub-range is explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

EXAMPLES

The following illustrates an example of the present disclosure. However, it is to be understood that the following is illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Carbon Black as a Flow Additive

Commercially available carbon black powders were evaluated for their effect on a flowability of stainless steel particles. The compositions tested included a control which was 100 wt % SANDVIK® 316L—22 μm (80 wt %) stainless steel particles having a D50 particle size of about 10 μm and about 80 wt % of the particles capable of passing through a 22 μm sieve. (commercially available from Sandvik AB, Sweden). Formulation A which included 99.9 wt % SANDVIK® 316L stainless steel particles and 0.1 wt % of a fumed silica flow additive, and Formulations B-G which included 99.9 wt % SANDVIK® 316L stainless steel particles and 0.1 wt % of a commercially available carbon black powder. The flow control additives, along with the D50 particle size for the various additives, is shown in Table 1.

TABLE 1

| Carbon Black Powder | | |
|---|---|---|
| Powder Bed Material Control | Carbon Black Powder* None | D50 Particle Size N/A |
| A | AEROSIL ™ R812 | 5-50 nm |
| B | ORION ® FW 200 | 13 nm |
| C | PRINTEX ® 75 | 17 nm |
| D | PRINTEX ® 85 | 16 nm |
| E | PRINTEX ® 95 | 15 nm |
| F | FW1 | 13 nm |
| G | FW18 | 15 nm |

*AEROSIL ™ R812 available from Cabot Corporation (USA)
*ORION ® FW available from Palmer Holland (USA)
*PRINTEX ® 75, PRINTEX ® 85, PRINTEX ® 95, FW1, FW18, all available from DEGUSSA ® AG (Germany)

The flowability of the compositions/admixtures was evaluated by loading a 35 ml sample of the composition/admixture into a GranuPack high resolution tap density analyzer, commercially available from GRANUTOOLS™, Belgium. The tap density analyzer measures the Hausner ratio ($N_{[n]}$), which is a flowability metric. A lower $H_{[n]}$ value indicates better flowability.

Figure 4:
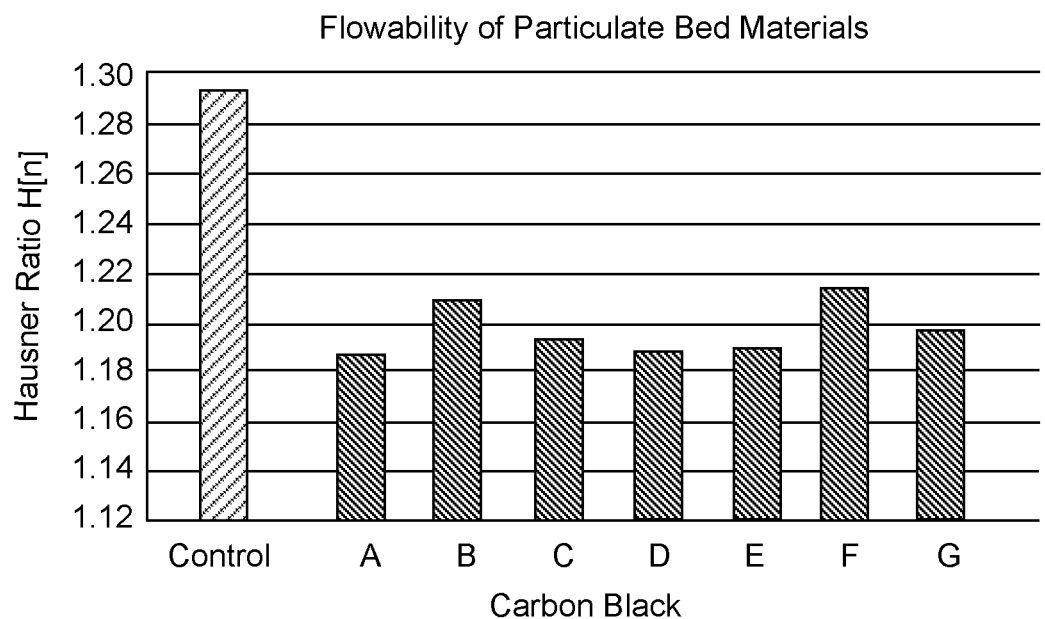
FIG. 4 is a bar graph of Hausner ratio vs. particulate bed materials in an example use in accordance with the present disclosure.

As presented in FIG. 4, the addition of 0.1 wt % carbon black to the admixture improved the flowability of the SANDVIK® 316L stainless steel particles in all formulations. In addition, the incorporation of PRINTEX® 75, PRINTEX® 85, and PRINTEX® 95 provided an increase in flowability that was substantially similar to the increase in flowability achieved from incorporating the same amount of a fumed silica flow additive.

Example 2—Weight Percentage of Carbon Black

In order to further determine an effective amount of carbon black as a flow additive, several admixtures of SANDVIK® 316L—22 μm stainless steel particles (commercially available from Sandvik AB, Sweden) having a D50 particle size distribution value of about 10 μm with about 80 wt % of the particles capable of passing through a 22 μm sieve was combined with varying amounts of PRINTEX® 95 carbon black available from Degussa AG (Germany). The various admixtures incorporated 0.005 wt %, 0.01 wt %, 0.02 wt %, 0.05 wt %, and 0.1 wt % of the carbon black with the balance being the stainless steel particles up to 100 wt %. The flowability of the admixtures was measured using the methodology and GranuPack high resolution tap density analyzer described above.

Figure 5:
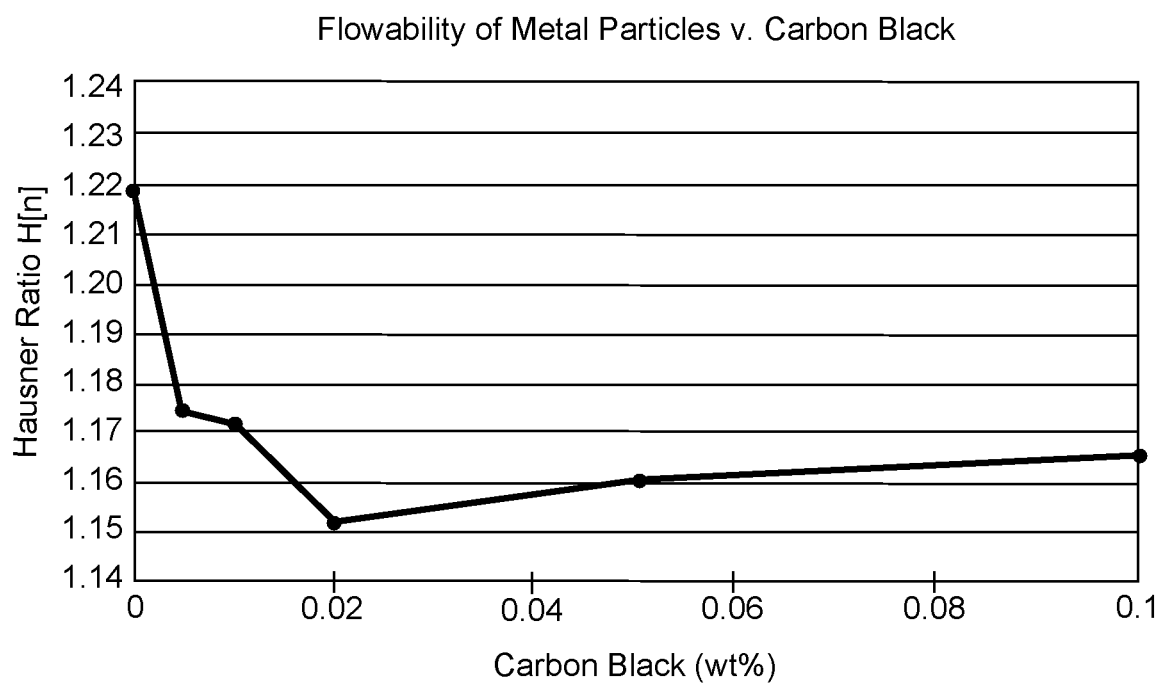
FIG. 5 is a plot graph of Hausner ratio vs. weight percentage of carbon black pigment in an example use in accordance with the present disclosure.

As illustrated in FIG. 5, the incorporation of even as low as 0.005 wt % carbon black improved the flowability, e.g. decreased the Hausner ratio ($N_{[n]}$), of the stainless steel particles. The greatest increase in flowability occurred with an admixture including 0.02 wt % carbon black.

What is claimed is:

1. A three-dimensional printing kit comprising:
   a binder fluid including an aqueous liquid vehicle and latex binder particles; and
   a spreadable dry particulate build material comprising:
   metal particles in an amount from about 95 wt % to about 99.995 wt %, having a D50 particle size ranging from 2 µm to 40 µm, and
   carbon black particles in an amount from about 0.005 wt % to about 2 wt %,
   wherein weight percentages are based on a total weight of the particulate build material.

2. The three-dimensional printing kit of claim 1, wherein the particulate build material is devoid of oxide flow control additives.

3. The three-dimensional printing kit of claim 1, wherein the metal particles include copper, cobalt, nickel, tungsten carbide, gold, silver, ferrous alloy, stainless steel, steel, high carbon steel, tool steel, an alloy thereof, or an admixture thereof.

4. The three-dimensional printing kit of claim 1, wherein the metal particles are stainless steel.

5. The three-dimensional printing kit of claim 1, wherein the metal particles have a D50 particle size distribution value from about 2 µm to about 30 µm.

6. The three-dimensional printing kit of claim 1, wherein the carbon black particles have a D50 particle size distribution value of about 10 nm to about 200 nm.

7. The three-dimensional printing kit of claim 1, wherein a surface area of the carbon black particles ranges from about 50 $m^2/g$ to about 600 $m^2/g$.

8. The three-dimensional printing kit of claim 1, wherein the binder fluid comprises water and latex particles, wherein the latex particles are present in an amount of from about 5 wt % to about 30 wt % in the binder fluid.

9. The three-dimensional printing kit of claim 1, wherein the particulate build material is devoid of semi-metal oxide flow control additives.

10. The three-dimensional printing kit of claim 1, wherein the latex binder particles have a particle size ranging from 10 nm to 400 nm.

11. A method of three-dimensional printing comprising:
    iteratively applying individual build material layers of a spreadable dry particulate build material comprising:
    metal particles in amount from about 95 wt % to about 99.995 wt % based on a total weight of the particulate build material, the metal particles having a D50 particle size ranging from 2 µm to 40 µm, and
    carbon black particles in an amount from about 0.005 wt % to about 2 wt % based on a total weight of the particulate build material;
    based on the 3D object model, selectively applying a binder fluid including an aqueous liquid vehicle and latex binder particles to the individual build material layers to define individually patterned layers that are built up and bound together to form a 3D green body object.

12. The method of three-dimensional printing of claim 11, further comprising heating a plurality of the individually patterned layers to drive off water to further solidify the 3D green body object during formation.

13. The method of three-dimensional printing of claim 11, further comprising sintering the 3D green body object at an elevated temperature from about 500° C. to about 3,500° C. to fuse the metal particles together and form a sintered 3D object.

14. The method of three-dimensional printing of claim 13, wherein sintering occurs in an atmosphere including a gas reactive with carbon at the elevated temperature to convert carbon from the carbon black particles to a gas, causing the carbon black particle content in the sintered 3D object to be lower than the particle content in the 3D green body object.

15. The method of three-dimensional printing of claim 13, wherein sintering occurs in an atmosphere inert with respect to carbon at the elevated temperature.

* * * * *